US011883337B1

(12) United States Patent
Mevorach et al.

(10) Patent No.: US 11,883,337 B1
(45) Date of Patent: Jan. 30, 2024

(54) SYSTEMS AND METHODS FOR MODULARLY LOADING DIFFERENT DRIVER SEATS INCLUDING WHEELCHAIRS ONTO AN OFF-ROAD VEHICLE AND AN OFF-ROAD VEHICLE INCLUDING SAME

(71) Applicant: B.A.K TECHNOLOGY LTD, Talme-Yafe (IL)

(72) Inventors: Kfir Mevorach, Talme-Yafe (IL); Shlomo Mevorach, Talme-Yafe (IL)

(73) Assignee: B.A.K TECHNOLOGY LTD, Talme-Yafe (IL)

( * ) Notice: Subject to any disclaimer, the term of this patent is extended or adjusted under 35 U.S.C. 154(b) by 0 days.

(21) Appl. No.: 18/069,356

(22) Filed: Dec. 21, 2022

Related U.S. Application Data

(60) Provisional application No. 63/373,264, filed on Aug. 23, 2022.

(51) Int. Cl.
*A61G 3/00* (2006.01)
*A61G 3/08* (2006.01)

(52) U.S. Cl.
CPC ...... *A61G 3/0808* (2013.01); *A61G 2220/145* (2013.01)

(58) Field of Classification Search
CPC ........... B60P 7/0892; B60P 7/08; B60P 7/135; B60P 3/06; B60P 1/435; B60P 1/433; B60P 1/4407; A61G 3/0808; A61G 2220/145
USPC ..... 410/7, 9–11, 19, 121; 180/198, 233, 907
See application file for complete search history.

(56) References Cited

U.S. PATENT DOCUMENTS 5,628,595 A * 5/1997 Harris .................. B60P 7/0807 410/7
7,425,110 B2 * 9/2008 Ditch .................. A61G 3/0808 410/7
7,753,630 B2 * 7/2010 Jeppsson ............. A61G 3/0808 410/7
7,854,576 B2 * 12/2010 Girardin ............. A61G 3/0808 410/7

* cited by examiner

*Primary Examiner* — Stephen T Gordon
(74) *Attorney, Agent, or Firm* — BROWDY AND NEIMARK, P.L.L.C.

(57) ABSTRACT

A modular seat loading system for loading of various driver seats onto an off-road vehicle (ORV), forming a modular wheelchair-accessible ORV. The modular system includes controllable length-adjustment devices, configured to controllably adjust angular position of a floor of the ORV, by controlling length thereof, for switch ably achieving ORV modes: a load mode in which a floor structure of the ORV is tilted forming a non-zero angle βετωεεν the ORV floor and a ground surface, for removably loading a wheelchair or a wheel-less seat for serving as a driver seat; and a drive mode in which the ORV floor structure is lifted from the ground. The modular seat loading system also includes a load controller configured at least for adjusting length of the length-adjustment devices. Each of the length-adjustment devices is also configured and used for movement suspension of the ORV by enabling natural expansion and contraction responsive to ORV movements and road conditions.

17 Claims, 10 Drawing Sheets

SYSTEMS AND METHODS FOR MODULARLY LOADING DIFFERENT DRIVER SEATS INCLUDING WHEELCHAIRS ONTO AN OFF-ROAD VEHICLE AND AN OFF-ROAD VEHICLE INCLUDING SAME

FIELD OF THE INVENTION

The present disclosure relates in general to modular seat loading systems for off-road vehicles for enabling wheelchair-accessibility and more particularly to a modular seat loading system for removable loading various driver seats including wheelchairs serving as a driver seat, onto an off-road vehicle having the modular seat loading system installed therein and off-road vehicles including or using such modular seat loading systems.

BACKGROUND

Vehicles that enable people with disabilities to drive the vehicle typically include a special designated driver seat that is fixedly installed to the vehicle and specifically designed for the driver's disabilities. These vehicles also typically include specially designed machinery controllers such as specially designed gear shifting handles, gas control etc.

People with motor-skills disabilities often avoid off-road and/or extreme driving due to high costs of the personal customizations required for adapting the off-road or all-terrain vehicle to their specific needs.

Few available off-road or all-terrain vehicles have a built-in driver seat that is suitable for disabled people that require a wheelchair for their everyday mobility, where the special driver seat and control means are designed for the disabled drivers' needs and disabilities yet in a generic manner. Since the driver seat of these vehicles is a single standard model/design and does not always fit the size, weight, and/or specific motoric disabilities of all disabled drivers and often requires further per-personalized customization.

These vehicles also require one or more other persons that will help the disabled driver to exits his/her wheelchair and to be seated at the driver seat, which is located at an elevation from the ground. The requirement of one or more other persons for entering, being seated and for exiting the vehicle prevents the disabled driver from accessing the vehicle at his/her own will and by himself/herself and thereby limits the disabled driver's sense of freedom, self-reliability and independency.

SUMMARY

Aspects of disclosed embodiments pertain to a modular seat loading system for removable loading of various driver seats onto an off-road vehicle (ORV), the modular seat loading system comprising at least:

(a) at least one controllable length-adjustment device directly or indirectly connectable to a frame of the ORV, the at least one controllable length-adjustment device being configured and positioned for controllable adjustment of angular position of a floor of the ORV that is fixedly connected to the frame of the ORV, by controlling length of the at least one controllable length-adjustment device, enabling controllably achieving at least two ORV modes switchable therebetween:

(I) a load mode in which the ORV floor and frame are tilted forming a tilted slope at a non-zero angle between the ORV floor and a ground surface plane, for loading and removing, upon requirement, a wheelchair or a wheel-less seat for serving as a driver seat of the ORV, for forming a modular wheelchair-accessible ORV; and (ii) a drive mode in which the ORV floor is lifted from the ground surface, and (b) a load controller configured at least for adjusting length of the at least one controllable length-adjustment device.

According to some embodiments, the at least one length-adjustment device includes: an extendible apparatus and one or more connectors for fixedly connecting the extendible apparatus to the frame or to the floor of the ORV, which is fixedly connected to the frame of the ORV.

Aspects of disclosed embodiments pertain to an off-road vehicle (ORV) having:

- a steering mechanism for steering the ORV;
- a rear wheels set including at least two rear wheels;
- a front wheels set including at least two front wheels;
- a frame;
- a floor fixedly attached to a lower side of the frame;
- a motorization mechanism including at least a first rear motor and a first front motor;
- a main controller for ORV drive control; and
- a modular seat loading system for removable loading of various driver seats onto the ORV, the modular seat loading system comprising at least:

(a) at least two controllable length-adjustment devices, each directly or indirectly connectable to a lower side of the frame, each controllable length-adjustment device being configured and positioned for controllable adjustment of angular position of the ORV's floor, by controlling length of each controllable length-adjustment device, enabling controllably achieving at least two ORV modes switchable therebetween:

(I) a load mode in which the ORV floor and frame are tilted forming a tilted slope at a non-zero angle between the ORV floor and a ground surface plane, for easy loading and removing, upon requirement, a wheelchair or a wheel-less seat for serving as a driver seat of the ORV, for forming a modular wheelchair-accessible ORV; and (ii) a drive mode in which the ORV floor is lifted from the ground surface, and (b) a load controller configured at least for adjusting length of the at least two controllable length-adjustment devices.

Each controllable length-adjustment device may also be used for movement suspension of the ORV by also enabling natural expansion and contraction thereof in response to ORV movements and road conditions.

According to some embodiments the motorization mechanism may include a single electric motor per each wheel that is embedded inside the respective ORV wheel.

According to some embodiments, the ORV may further include a protective frame such as a roll bar or a roll cage, fixedly and optionally integrally connected to the frame of the ORV.

The present invention provides a modular seat loading system for removable loading of various driver seats onto an off-road vehicle (ORV), the modular seat loading system comprising at least:

(a) at least one controllable length-adjustment device comprising at least one extendible apparatus directly or indirectly connectable to a frame of the ORV, the at least one controllable length-adjustment device being configured and positioned for controllable adjustment of angular position of a floor of the ORV that is fixedly connected to the frame of the ORV, by controlling length of the at least one extendible apparatus, enabling controllably achieving at least two ORV modes switchable therebetween:
- a load mode in which the ORV floor structure is tilted forming a tilted slope at a non-zero angle between the ORV floor and a ground surface plane, for loading and removing, upon requirement, a wheelchair or a wheel-less seat for serving as a driver seat of the ORV, for forming a modular wheelchair-accessible ORV; and
- a drive mode in which the ORV floor structure is lifted from the ground surface, (b) a load controller configured at least for adjusting length of the at least one controllable length-adjustment device.

wherein the at least one controllable length-adjustment device is also used for controlling the movement suspension of the ORV by enabling natural expansion and contraction thereof in response to ORV movements and road conditions.

The present invention provides an off-road vehicle (ORV) comprising at least:
- a steering mechanism for steering the ORV;
- a rear wheels set including at least two rear wheels;
- a front wheels set including at least two front wheels;
- a frame;
- a floor fixedly attached to a lower side of the frame;
- a motorization mechanism including at least a first rear motor and a first front motor;
- a main controller for ORV drive control; and
- a modular seat loading system as described above.

According to some embodiments of the present invention the at least one length-adjustment device includes: an extendible apparatus and one or more connectors for fixedly connecting the extendible apparatus to the frame or to the floor of the ORV.

According to some embodiments of the present invention, the at least one length adjustment device is connected to a rear axle of the rear wheels or to at least one rear wheel hinge such that when the extendible apparatus is extended in length, the respective wheel to which it connects is lifted from the ground and when the extendible apparatus is contracted in length the respective rear wheel is lowered. According to some embodiments of the present invention the at least one length adjustment device function as the ORV's rear suspensions, as lifting of the rear wheels cause natural responsive contraction of the extendible apparatus of each length-adjustment device and vice versa.

According to some embodiments of the present invention the at least one extendible apparatus of the length-adjustment device includes a pneumatic or hydro-pneumatic position device having a piston part and a housing part, where the piston part is movably insertable in the housing part.

According to some embodiments of the present invention the at least one length-adjustment device is located externally to the ORV's walls adjacent to side walls of the ORV for allowing the extendible apparatus a large-enough span of extension thereby also enabling improved suspension/damping of ORV movements for challenging terrain conditions.

According to some embodiments of the present invention, the modular seat loading system comprise at least one controllable lock holder that rigidly connects at one end thereof to the ORV floor and at another end thereof to a rear wall or panel of the ORV cover, wherein the rear wall of the ORV is releasably connectable to the ORV frame, such that when the controllable lock holder is unlocked, at least one side of the rear panel is released from its releasable connection to the ORV frame, for titling along with the ORV floor, forming a loading ramp-extension, when the ORV is switched to a load mode, wherein the lock holder is configured such that the rear panel can be lifted back thereby, to an upright position, when the ORV is switched to a drive mode.

According to some embodiments of the present invention the controllable lock holder is controllable by the load controller such that when the modular seat loading system is switched to a load mode the ORV floor and rear wall are both automatically lowered forming an extended sloped floor reaching the ground surface, for enabling an easy and safe driving of a wheelchair thereover and there-along, for having the disabled driver safely and comfortably reaching a driver seat location/area inside the ORV.

According to some embodiments of the present invention modular seat loading system further comprising, a seat-fastening mechanism, for locking, fastening or attaching the loaded driver seat to the ORV's frame and/or floor at the driver seat area of the ORV and at a desired seat position, wherein further comprising one or more tracks for easy rolling of a wheelchair's wheels therein or thereover and for directing the wheelchair along the ORV's floor, preventing thereby the wheelchair from turning and/or slipping over the ORV floor.

According to some embodiments of the present invention the modular seat loading system further comprising a lock holder configured such that the rear panel is lifted back thereby.

According to some embodiments of the present invention the extendible lock having at least two parts: a first part and a second part moveable one in respect to the other for extending and contracting in an overall length thereof, such that when the lock holder is at its maximal extension span the rear panel is at a coplanar position with the ORV floor to enable the load position mode ramp-extension, and when the lock holder is at its minimal extension span the rear panel is at an upright position with the ORV floor to enable the drive position mode.

According to some embodiments of the present invention the at least one controllable length-adjustment device further comprising:
- a first lower connector fixedly connected to a side part of the frame or of a cover panel of the of the ORV; and
- a second connector fixedly connected to a lower floor part of the frame or a lower side cover panel part of the of the ORV;
- wherein the extendible apparatus, first connector and the second connector from a triangular shape forming a non-zero angle θ between the x1 axis aligned with the first second connector and the extension axis EX that may change and be different at the load mode position of the ORV and at its drive mode position θ1.

According to some embodiments of the present invention the load controller comprises at least:
- a floor control module configured to control floor position (sloping mode) by controlling the controllable length-adjustment devices;
- a ramp control module configured to control rear panel by controlling the length and locking position of the lock holder;
- a seat guide module configured to control the wheelchair guiding subsystem;

According to some embodiments of the present invention the modular seat loading system further comprising a wheelchair guiding subsystem comprising tracks and an adjustment mechanism, configured and positioned for enabling adjustment of one or more features of the wheelchair guiding subsystem.

According to some embodiments of the present invention the modular seat loading system further comprising an ORV controller comprised of a motor control module for controlling all electric motors and a steer control module for controlling steering of the ORV.

According to some embodiments of the present invention the main controller module include at least two main units: an ORV controller module and a load controller.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 1A shows a side view of the ORV in the drive mode state; FIG. 1B, shows a controllable length-adjustment device of the modular seat load system, according to some embodiments that also serves as the ORV rear suspension; FIG. 1C shows a side view of the ORV in the drive mode state having a disabled driver using a wheelchair as a driver seat, according to some embodiments; FIG. 1D shows a rear isometric view of the ORV in the drive mode state; and FIG. 1E shows an elevated view of the ORV for showing details of a lock holder that can be folded to be used as a back/rear panel of the ORV and can be released for being used as an extension ramp for ORV floor extension, according to some embodiments.

FIG. 2A shows a side view of the ORV in the load mode, and a wheelchair directed to be loaded thereto; FIG. 2B shows the ORV main parts when in the load mode; FIG. 2C shows the controllable length-adjustment device of the modular seat load system of the ORV when in the load mode; and FIG. 2D shows an isometric view of the ORV.

DETAILED DESCRIPTION

Figure 1A:
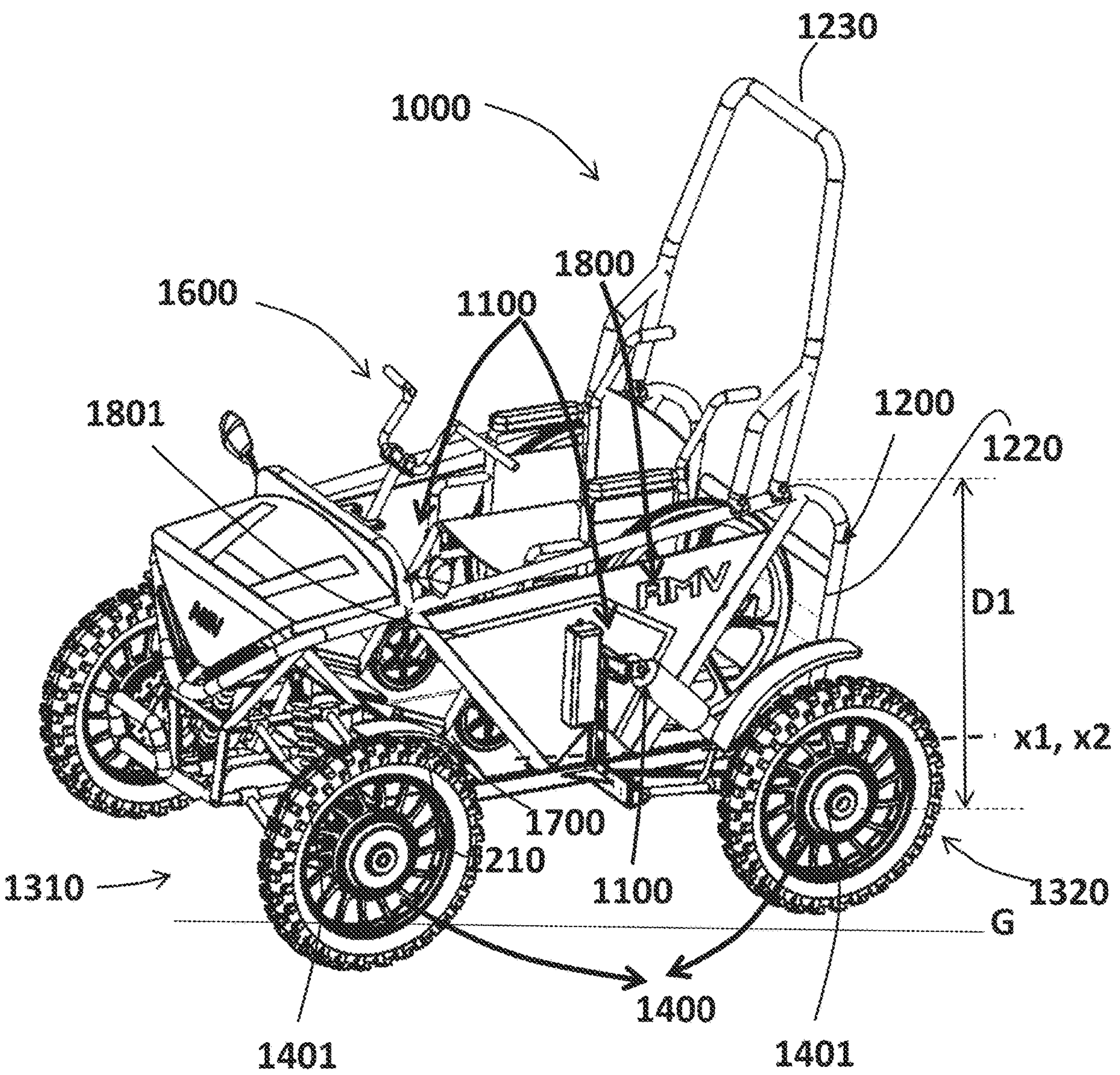
FIGS. 1A-1E show various parts and/or views of an off-road vehicle (ORV) with a modular seat load system embedded therein for allowing various driver seats including a wheelchair driver seat to be loaded to the ORV, when the modular seat load system is in a drive mode in which the ORV floor are substantially parallel to a ground surface plane, according to some embodiments.

Aspects of disclosed embodiments pertain to modular seat loading systems for off-road vehicles and off-road vehicles including same, inter alia, for enabling both disabled and non-disabled drivers to drive the off-road vehicle (ORV) while enabling each disabled driver, typically mobilized by his/her own wheelchair to use his/her own personal regularly wheelchair as the driver seat. The ORVs and modular seat loading systems enable the disabled driver to autonomously operate controllable lifting a floor of the ORV and optionally a rear wall of the ORV to form a tilted ramp like floor that allows him/her to easily roll his/her wheelchair thereover to position him/herself at a driver seat location in the ORV, and for exiting the ORV.

Proposed embodiments provide significant improvement in allowing disabled people wishing to drive off-road vehicles and being able to easily enter and exit the ORV by themselves to be able to both self-control all operations of the ORV and of the modular seat loading system embedded in the ORV, without requiring help from another person, while using a wheelchair that is already used by them for non-driving purposes and is already suited for their needs and comfort.

In addition, the ORV being used may include a per-wheel motorization such that the ORV includes several motors each connected to or embedded in a different ORV wheel where the ORV has a central motors control for coordinating all ORV motors' (and wheels) operation.

Additionally, the ORV and modular seat loading system embedded therein allow using the same ORV also for drivers who do not require use of a wheelchair by enabling modular installment/attaching of a wheel-less driver seat instead thereby proving an enhanced modular ORV suited for multiple drivers' requirements.

The term ORV used herein may refer to any vehicle that is adapted to challenging terrain conditions including ORVs that are only designed for off-road driving and/or all-terrain vehicles.

Aspects of disclosed embodiments pertain to a modular seat loading system for removable loading of various driver seats onto an off-road vehicle (ORV), the modular seat loading system comprising at least:

(a) at least one controllable length-adjustment device directly or indirectly connectable to a frame (chassis) of the ORV, the at least one controllable length-adjustment device being configured and positioned for controllable adjustment of angular position of a floor of the ORV that is fixedly connected to the frame of the ORV, by controlling length of the at least one controllable length-adjustment device, enabling controllably achieving at least two ORV modes switchable therebetween:

(i) a load mode in which the ORV floor and frame are tilted forming a tilted slope at a non-zero angle between the ORV floor and a ground surface plane, for loading and removing, upon requirement, a wheelchair or a wheel-less seat for serving as a driver seat of the ORV, for forming a modular wheelchair-accessible ORV; and (ii) a drive mode in which the ORV floor is lifted from the ground surface, and (b) a load controller configured at least for adjusting length of the at least one controllable length-adjustment device.

According to some embodiments, the at least one length-adjustment device includes: an extendible apparatus and one or more connectors for fixedly connecting the extendible apparatus to the frame or to the floor of the ORV.

According to some embodiments, the length adjustment device may also be connected to a rear axle of the rear wheels or to at least one rear wheel hinge such that when the extendible apparatus is extended in length, the respective wheel to which it connects is lifted from the ground and when the extendible apparatus is contracted in length the respective rear wheel is lowered.

The length adjustment device(s) are also used as the ORV's rear suspensions, since lifting of the rear wheels will also cause natural responsive contraction of the extendible apparatus of each length-adjustment device and vice versa.

According to some embodiments, the extendible apparatus of the length-adjustment device includes a pneumatic or hydro-pneumatic position device having a piston part and a housing part, where the piston part is movably insertable in the housing part. In case of using a pneumatic piston device for extending and contracting length of the extendible apparatus, one or more throttles/valve and air channeling subsystems and/or equipment may be used.

According to some embodiments, each length-adjustment device may be located externally to the ORV's walls adjacent to side walls of the ORV for allowing the extendible apparatus a large-enough span of extension thereby also enabling improved suspension/damping of ORV movements for challenging terrain conditions as well as for allowing a comfortable slope angle of the floor in the load mode position.

According to some embodiments, the modular seat loading system may also include at least one controllable lock holder that rigidly connects at one end thereof to the ORV floor and at another end thereof to a rear wall or panel of the ORV cover, wherein the rear wall of the ORV is releasably connectable to the ORV frame, such that when the controllable lock holder is unlocked, at least one side of the rear panel is released from its releasable connection to the ORV frame, for titling along with the ORV floor, forming a loading ramp-extension, when the ORV is switched to a load mode. The lock holder is configured such that the rear panel can be lifted back thereby, to an upright position, when the ORV is switched to a drive mode.

The controllable lock holder may be controllable by the load controller such that when the modular seat loading system is switched to a load mode the ORV floor and rear wall are both automatically lowered forming an extended sloped floor reaching the ground surface, for enable an easy and safe driving of a wheelchair thereover and there-along, for having the disabled driver safely and comfortably reaching a driver seat location/area inside the ORV.

According to some embodiments, the modular seat loading system may also include a seat-fastening mechanism, for locking/fastening/attaching the loaded driver seat (whether a wheelchair or a regular seat) to the ORV's frame and/or floor at the driver seat area of the ORV and at a desired seat position.

According to some embodiments, the modular seat loading system may also include one or more tracks for easy rolling of a wheelchair's wheels therein or thereover and for directing the wheelchair along the ORV's floor, preventing thereby the wheelchair from turning and/or slipping over the ORV floor.

The one or more tracks can be adjustable using one or more track-adjustment mechanisms that enable adjusting one or more of: distance between the tracks; length of each track; and/or width of each track, for adapting the configuration of the one or more tracks to the specific configuration of the wheels of the driver's wheelchair.

Aspects of disclosed embodiments pertain to an off-road vehicle (ORV) having:

a steering mechanism for steering the ORV;

a rear wheels set including at least two rear wheels;

a front wheels set including at least two front wheels;

a frame;

a floor fixedly attached to a lower side of the frame;

a motorization mechanism including at least a first rear motor and a first front motor;

a main controller module for ORV drive control; and a modular seat loading system for removable loading of various driver seats onto the ORV, the modular seat loading system comprising at least:

(a) at least two controllable length-adjustment devices, each directly or indirectly connectable to a lower side of the frame, each controllable length-adjustment device being configured and positioned for controllable adjustment of angular position of the ORV's floor, by controlling length of each controllable length-adjustment device, enabling controllably achieving at least two ORV modes switchable therebetween:

(i) a load mode in which the ORV floor and frame are tilted forming a tilted slope at a non-zero angle between the ORV floor and a ground surface plane, for easy loading and removing, upon requirement, a wheelchair or a wheel-less seat for serving as a driver seat of the ORV, for forming a modular wheelchair-accessible ORV; and (ii) a drive mode in which the ORV floor is lifted from the ground surface, and (b) a load controller configured at least for adjusting length of the at least two controllable length-adjustment devices.

Each controllable length-adjustment device may also be used for movement suspension of the ORV by also enabling natural expansion and contraction thereof in response to ORV movements and road conditions.

According to some embodiments, the ORV may be designed for a single driver-passenger.

According to some embodiments the motorization mechanism may include a single motor per each wheel that is embedded inside the respective ORV wheel.

According to some embodiments the motorization mechanism may include a single motor per each wheel or a single motor per each wheel set, wherein the main controller may be configured to coordinate operation of all motors of the motorization mechanism.

According to some embodiments, the ORV may further include a protective frame such as a roll bar or a roll cage, fixedly and optionally integrally connected to the frame of the ORV.

According to some embodiments each electric motor, embedded in or connected to each wheel of the ORV may be powered via a central power source or have its own rechargeable power source (e.g., battery).

Reference is now made to FIGS. 1A-1E and 2A-2D and FIG. 3 showing an ORV 1000 for a single driver-passenger, having a modular seat loading system embedded therein, for enabling modular changing of a driver seat including using a personal driver's wheelchair as the driver seat, at two different operation modes: a load mode (FIGS. 2A-2D) and a drive mode (FIGS. 1A-1D and FIG. 3), according to some embodiments.

The ORV 1000 may include at least:

- a steering mechanism 1600 including a steering hinge/rod and a steer wheel or handle bar(s);
- a front wheel set 1310 and a rear wheel set 1320;
- a frame 1200;
- a floor 1700 optionally fixedly and rigidly connectable to a lower part 1210 of the ORV 1000 frame 1200;
- a motorization mechanism 1400 comprising separate per-wheel electrical motors 1401 each located and configured for separate motorizing/rotation of a different ORV 1000 wheel and one or more power sources (not shown) for powering the motors 1401;
- an ORV cover structure 1800 including one or more cover panels such as panels 1801; and
- a modular seat loading system including at least: two controllable length-adjustment devices 1100, each located at an opposite side of the ORV 1000 externally from the ORV cover structure 1000. Each controllable length-adjustment device 1100 may be operable by using an ORV electric motor 1401 of the approximate rear ORV wheel, or by using a separate motor powered by a separate power source, where one or more parts of each controllable length-adjustment device 1100 can be controllably extended and contracted in length.

In any case, the extension and contraction of one or more elements of each controllable length-adjustment device 1100 may be enabled by using a transmission subsystem (not shown) that is configured for transmission of rotational movement of a drive shaft rotated by any motor selected for the ORV design, into linear movements of the one or more moveable parts of the length-adjustment device 1100. For example, using a piston device design and such transmission subsystem that translates drive shaft rotational movements into linear movements of a piston element in/out of a corresponding piston housing of the piston device.

According to some embodiments, the ORV cover 1800 may also include a rear panel 1805 and the modular seat loading system may include a rear lock holder 1900.

Figure 1C:
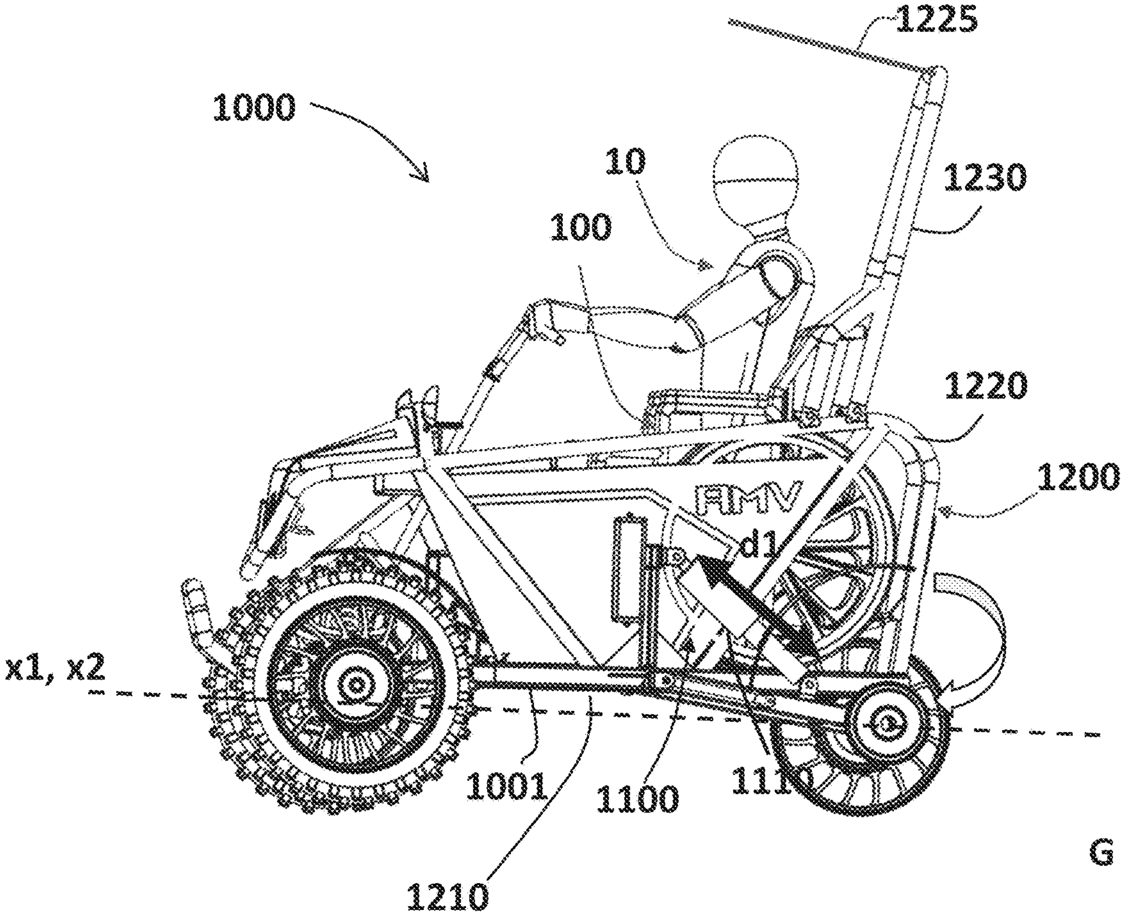
Figure 1D:
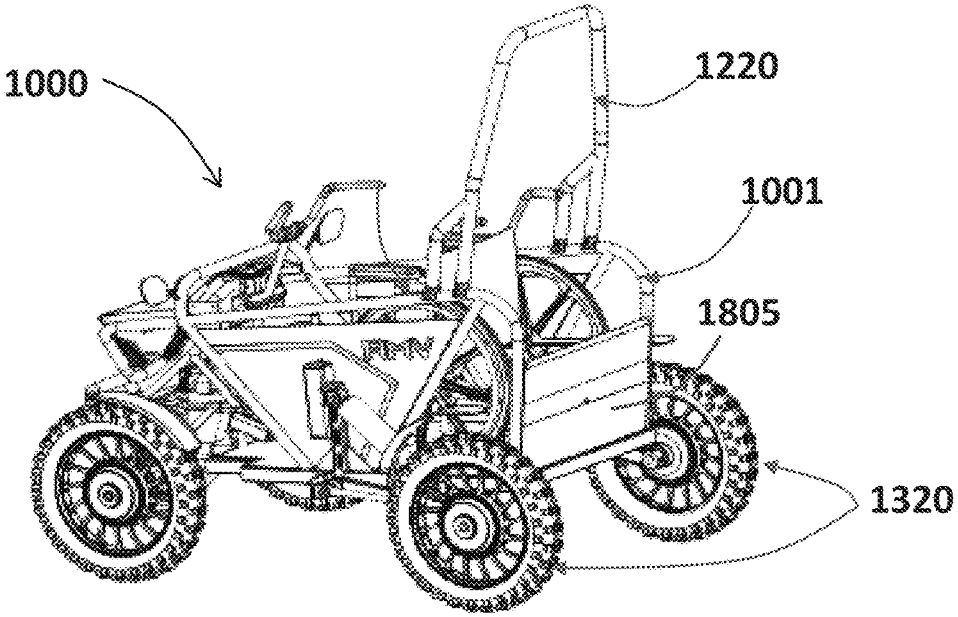
Figure 1E:
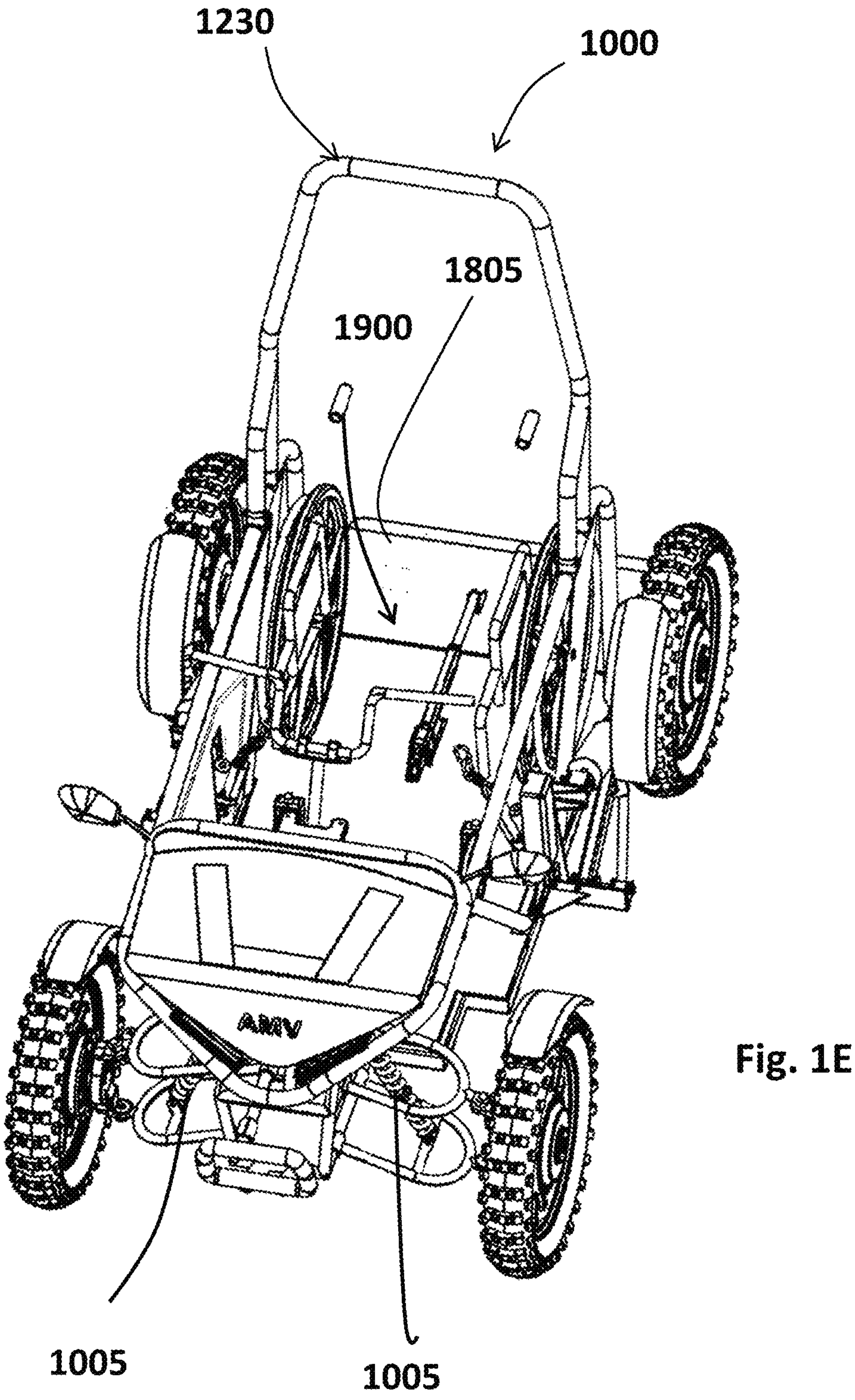
Figure 2A:
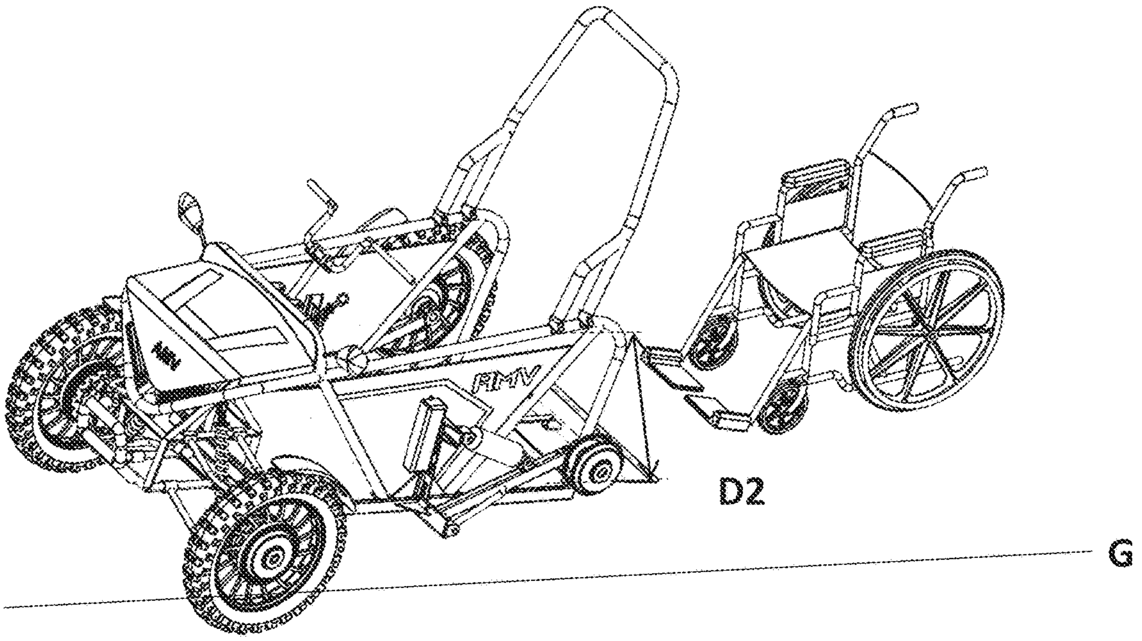
FIGS. 2A-2D show the ORV in a load mode state, in which the ORV floor is lowered to form a sloped extended floor for loading a driver seat such as a wheelchair, according to some embodiments.
Figure 2B:
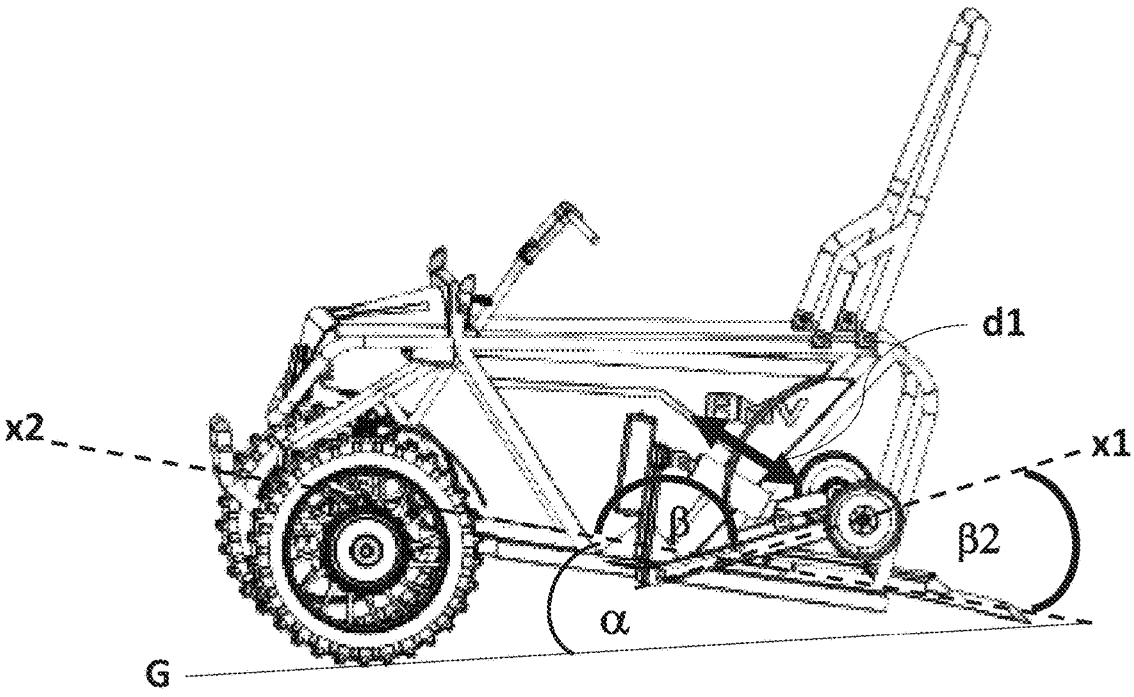
Figure 2C:
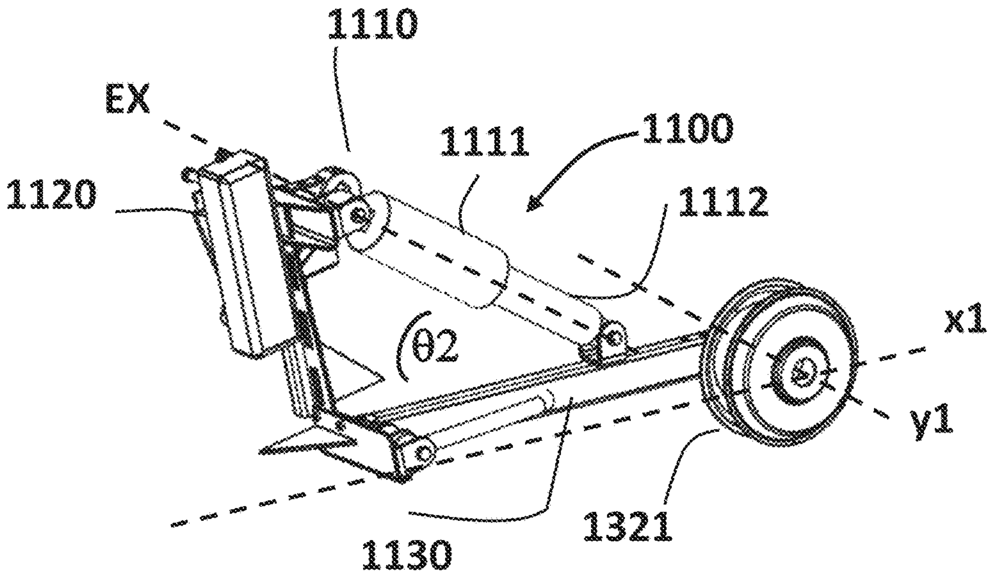
Figure 2D:
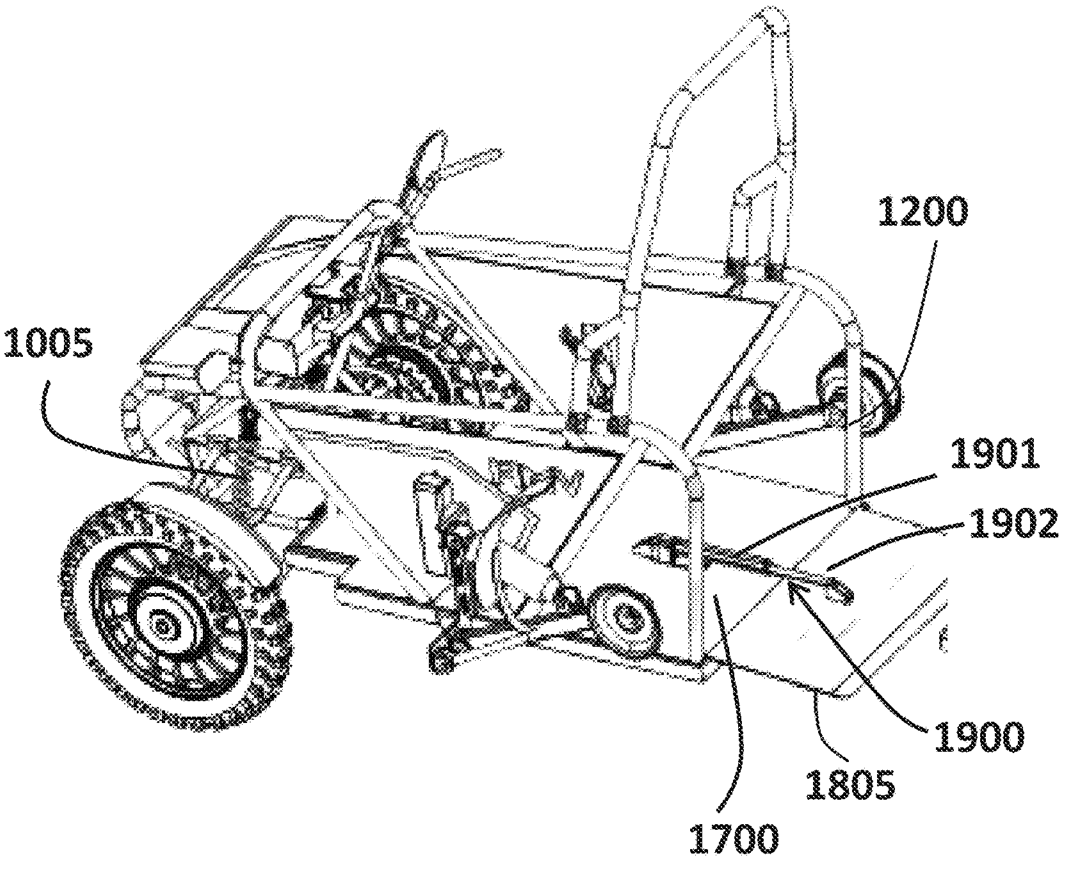

The lock holder 1900 (see FIG. 1D and FIG. 3 for the drive mode and FIGS. 2D-2D for the load mode) may be rigidly connected at one end thereof to the ORV floor 1700 and at another end thereof to the rear panel 1805 of the ORV cover 1800. The rear panel 1805 of the ORV 1000 may be releasably connectable to a rear part 1220 of the ORV frame 1200, such that when the controllable lock holder 1900 is unlocked, at least one side of the rear panel 1805 is released from its releasable connection to the ORV rear frame part 1220, for becoming coplanar with the ORV floor 1700, forming a loading ramp-extension, such as shown in FIGS. 2B and 2D. When the ORV 1000 is switched to a drive mode, the lock holder 1900 is configured such that the rear panel 1805 can be lifted back thereby, to an upright position such as shown in FIG. 1C, forming a non-zero angle with the floor 1700.

According to some embodiments, the controllable lock holder 1900 may be controllable by a load controller of the modular seat loading system such that when the modular seat loading system is switched to a load mode the ORV floor 1700 and rear panel 1805 are both automatically lowered (by the controllable length-extension apparatuses 1110 and the lock holder 1900) forming an extended sloped floor combined by the ROV floor 1700 and the coplanar ramp extension formed by the rear panel 1805, reaching the ground surface G, for enable an easy and safe driving of a wheelchair 100 thereover and there-along, for having a disabled driver 10 safely and comfortably reaching a driver seat location/area inside the ORV 1000.

As can be seen in detail in FIG. 2D (in a fully load mode position), the controllable lock holder 1900 may be an extendible lock (such as a controllable telescopic rod or a piston device) having at least two parts: a first part 1901 and a second part 1902 moveable one in respect to the other for extending and contracting in an overall length thereof, such that when the lock holder 1900 is at its maximal extension span the rear panel 1805 is at a coplanar position with the ORV floor 1700 to enable the load position mode ramp-extension, and when the lock holder 1900 is at its minimal extension span (maximum contraction) the rear panel 1805 is at an upright position with the ORV floor 1700 to enable the drive position mode.

Figure 1B:
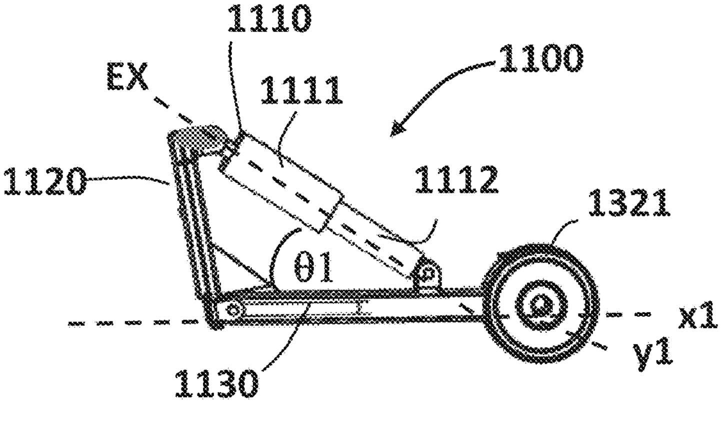

According to some embodiments, each controllable length-adjustment device 1100 may include (see FIGS. 1B and 2C):

- an extendible apparatus 1110 such as a controllable pneumatic or hydro-pneumatic piston device, which can extend and contract in overall length thereof along an extension axis "EX";
- a first (lower) connector 1120, fixedly connected to a side part of the frame 1220 or of a cover panel 1801 of the of the ORV 1000; and
- a second connector 1130, fixedly connected to a lower floor part of the frame 1200 or a lower side cover panel 1801 part of the of the ORV 1000, such that the extendible apparatus 1110, the first connector 1120 and the second connector 1130 from a triangular shape forming a non-zero angle θ between the x1 axis aligned with the first second connector 1130 and the extension axis EX that may change and be different at the load mode position of the ORV 1000 (FIG. 2C) and at its drive mode position θ1 (FIG. 1B).

According to some embodiments, when the extension of the extendible apparatus 1110 is at a maximal extension span, the modular seat loading system and the ORV 1000 reach a full drive mode, in which the ORV floor 1700 and optionally the entire lower frame part 1210 of the ORV 1000 are in an upright position in which a floor plane or floor axis x2 located over the floor plane is coplanar or aligned with an axis x1 constantly aligned with the second connector 1130: i.e. x1 and x2 are parallel to one another forming a zero angle therebetween (see FIG. 1A).

When the extension of the extendible apparatus 1110 is at a minimal extension span, the modular seat loading system and the ORV 1000 reach a full load mode, in which the rear wheels 1320 the ORV 1000 are lifted from the ground, and the ORV floor 1700 and optionally the entire frame part 1200 are lowered to a sloped position forming a non-zero (optionally smaller than 90 degrees) angle "α" between the ORV floor 1700 and the ground surface G, and the floor axis x2 also forms a non-zero angle "β" (optionally higher than 90 degrees) with the axis x1 (see FIG. 2B) that is aligned with the second connector 1130. The modular seat load system may be designed to form a specific desired value of a slope angle "α" of the ORV floor 1700.

It can be seen in FIGS. 1A and 2B each showing the ORV 1000 in a different operation mode, that the contraction of the extendible apparatuses 1110 of the ORV 1000, causes the rear wheels of the ORV rear wheels set 1320 to lift from the ground surface G forming a non-zero angle "α". The slope angle of the ORV floor 1700 may be designed to be lower than a maximum slope angle threshold $\alpha_{th}$ such as to reduce chances of having a wheelchair rolled over the ORV floor 1700 for loading thereof by the disabled driver, from slipping backwards along the slope requiring little force to be applied by the driver for resisting gravitational force pulling the wheelchair backwards along the slop towards the ground.

According to some embodiments the ORV floor 1700 may be coated with anti-slip material or have stripes or patches of anti-slip material adhered or painted/coated thereover for further preventing the wheelchair from slipping backwards towards the ground when loaded by rolling thereof over the ORV floor 1700.

According to some embodiments the length adjustment of the extendible apparatuses 1110 of both controllable length-adjustment devices 1100 may be done simultaneously and in a coordinated manner such that both extendible apparatuses 1110 will be extended or contracted to the same length or a coordinated relative ratio between their overall lengths.

According to some embodiments, each extendible apparatus 1110 may include an inflatable bladder/bag therein that can inflate and deflate depending on controlled operations and terrain conditions, and a piston element that can be moved into and out of a piston housing of the extendible apparatus 1110 for serving as a pneumatic suspension of the OVR 1000 itself by enabling natural responsive movement of the piston element and housing one in respect to the other and therefore natural responsive inflation and deflation of the inner bladder/bag creating consequential corresponding natural responsive expansion/extension/increase and contraction/reduction of the overall length of the extendible apparatus 1110.

According to some embodiments, as shown in FIG. 1A, the frame 1200 may include three main parts: a lower frame part 1210 connected and/or supporting the ORV floor 1700, a middle part 1220 forming the outlines/frame of the main body of the ORV 1000 and a protective frame part 1230 which may include a roll bar or a roll cage structure, serving as an additional security means of the ORV 1000.

The three frame parts 1210, 1220 and 1230 may be monolithically designed as a single rigid piece, rigidly connected to one another or have pieces/parts thereof rigidly connected to one another.

Figure 3:
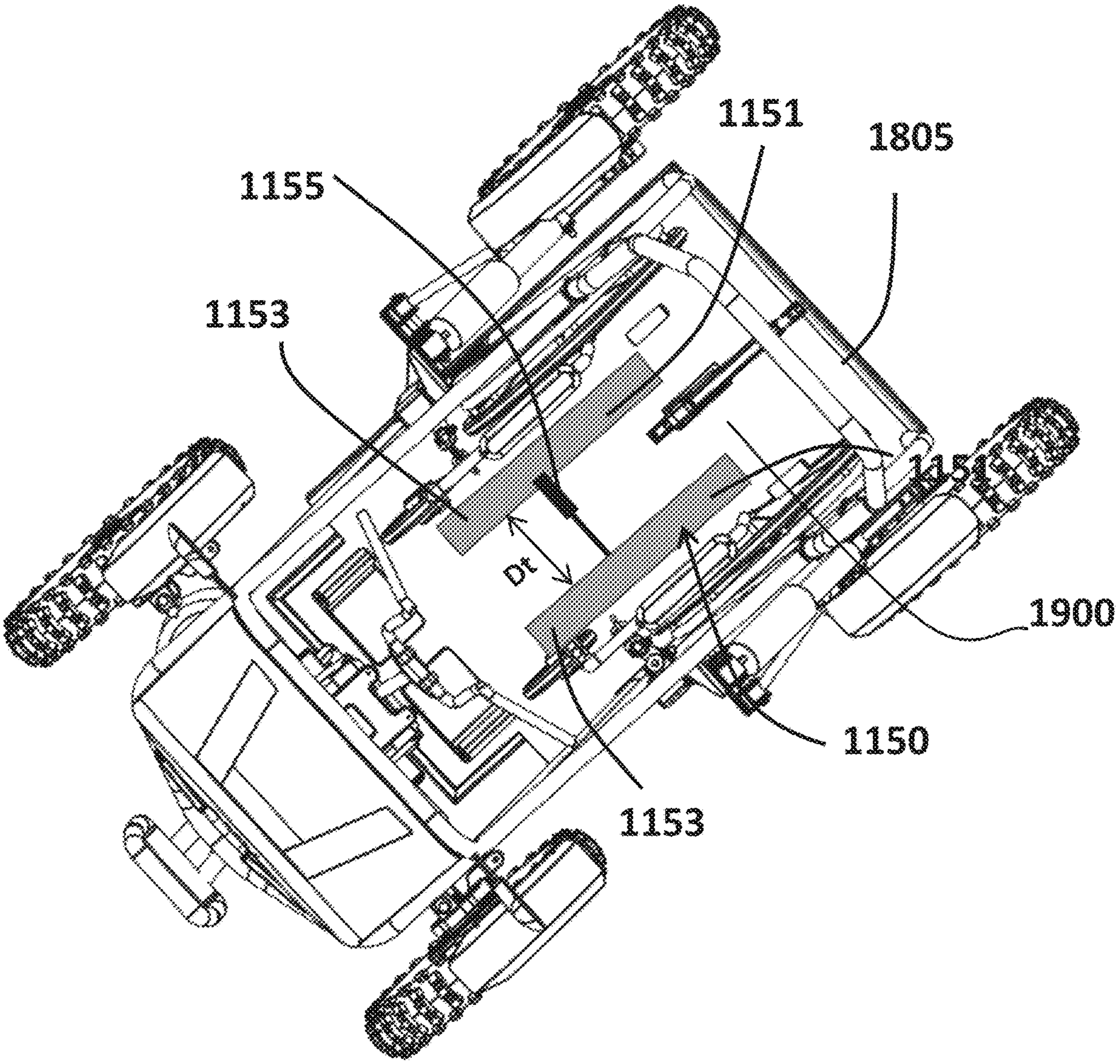
FIG. 3 shows an elevated the ORV and embedded modular seat load system in a drive mode state, for showing an adjustable wheelchair guide subsystem for supporting in guiding the wheelchair along the ORV floor for loading and exiting of the wheelchair from the ORV, according to some embodiments.

According to some embodiments, as can be seen in details in FIG. 3, the modular seat loading system may further include a wheelchair guiding subsystem 1150 including, for example tracks 1151 that allow separate per-wheel guiding of each wheel of the wheelchair towards the driver seat area in the ORV 1000 and prevent the wheelchair from diverting from a preset roll trajectory/orbit for improved localization of the wheelchair in the driver seat area by the disabled driver sitting thereover.

As seen in FIG. 3, the wheelchair guiding subsystem 1150 may also include an adjustment mechanism, configured and positioned for enabling adjustment of one or more features of the wheelchair guiding subsystem 1150 such as: dimensions of each track 1151 e.g., for fitting various wheelchairs' wheel thicknesses; and/or adjustment of the distance Dt between the tracks, for enabling adjusting for different wheels-distances of different wheelchairs; etc., such as track-distance adjustment mechanism 1555 shown in FIG. 3 using an extendible (telescopic) device such as a piston device that can be manually and/or controllably (electronically) adjusted in length.

According to some embodiments, the wheelchair guiding subsystem 1150 may also include stoppers 1153 at an edge of each track 1151 that is proximal to the front part of the ORV 1000 to prevent the wheelchair seat 100 from exceeding the stoppers for helping in positioning the driver 10 in the right location at the ORV driver seat area. The stoppers location can also be adjusted manually or electronically/controllably to fit driver's needs and/or driver seat 100 dimensions, design etc.

Figure 4A:
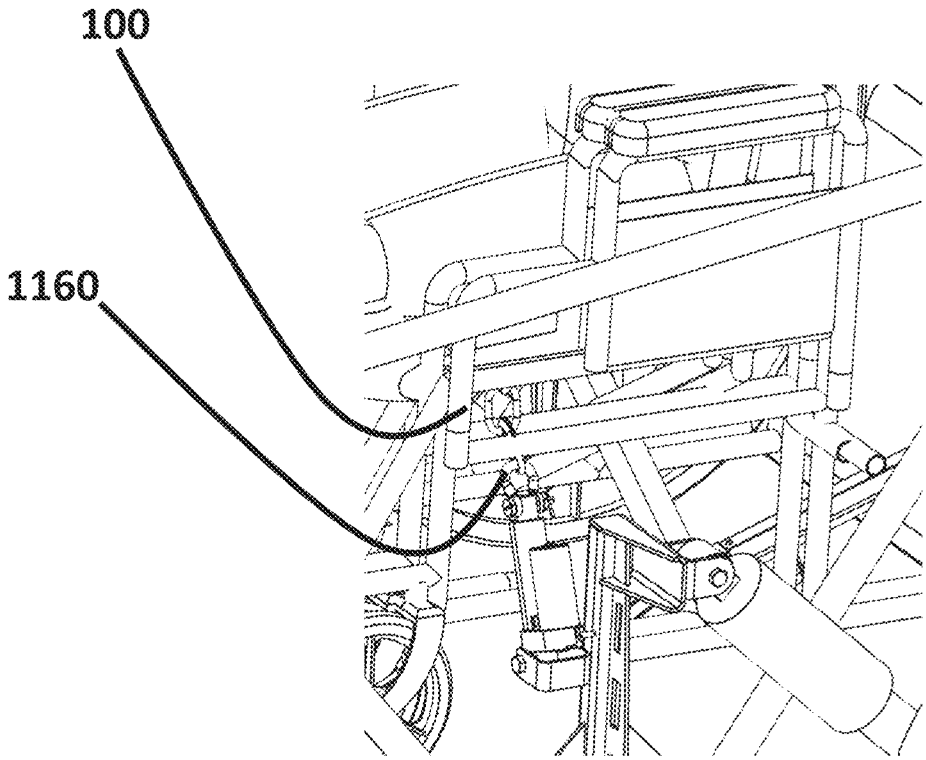
FIGS. 4A and 4B show a zoom-in view of a seat fastener, one or more of which can be used for fastening the driver seat (e.g., a wheelchair) to the ORV's frame and/or walls, according to some embodiments.
Figure 4B:
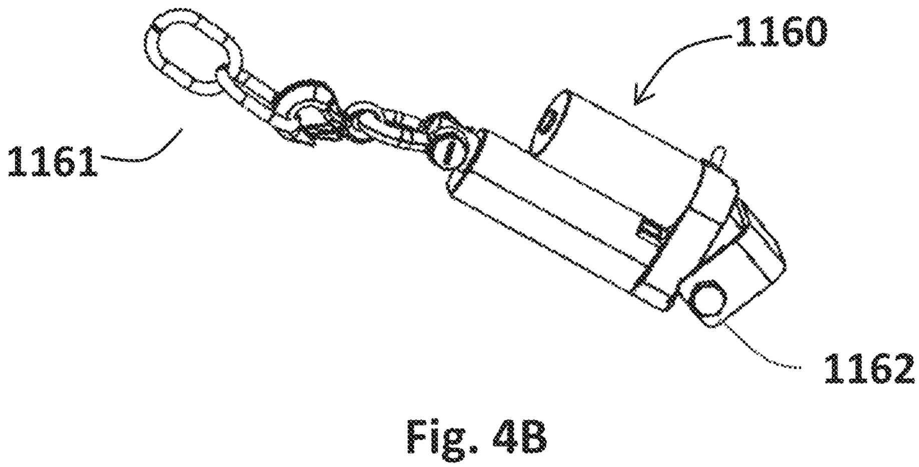

According to some embodiments, as seen in more details in FIGS. 4A-4B, the modular seat loading system 1100 may further include one or more seat fasteners such as seat fastener 1160 for securing the wheelchair 100 or any other driver seat being loaded to the ORV frame 1200, in a removable manner. As shown in FIG. 4B, for example, two seat fasteners 1160 may be used each removably fastened/locked to a different side of a frame of the wheelchair seat 100 (e.g. via a lock edge 1161) at one end and fixedly connect to a corresponding ORV frame 1200 side (e.g., via a connector 1162). The seat fastener 1160 design and dimensions may be such that allow movement span of the driver seat 100.

According to some embodiments, the seat fasteners 1160 may be designed such as to reduce/prevent the driver seat being loaded from being moved along a plane that is parallel to the ORV floor 1700 and/or from jumping upwards from the ORV floor 1700 and may also including damping means for allowing some such movements yet limiting their span and/or damping (dissipating energy) thereof.

Figure 5:
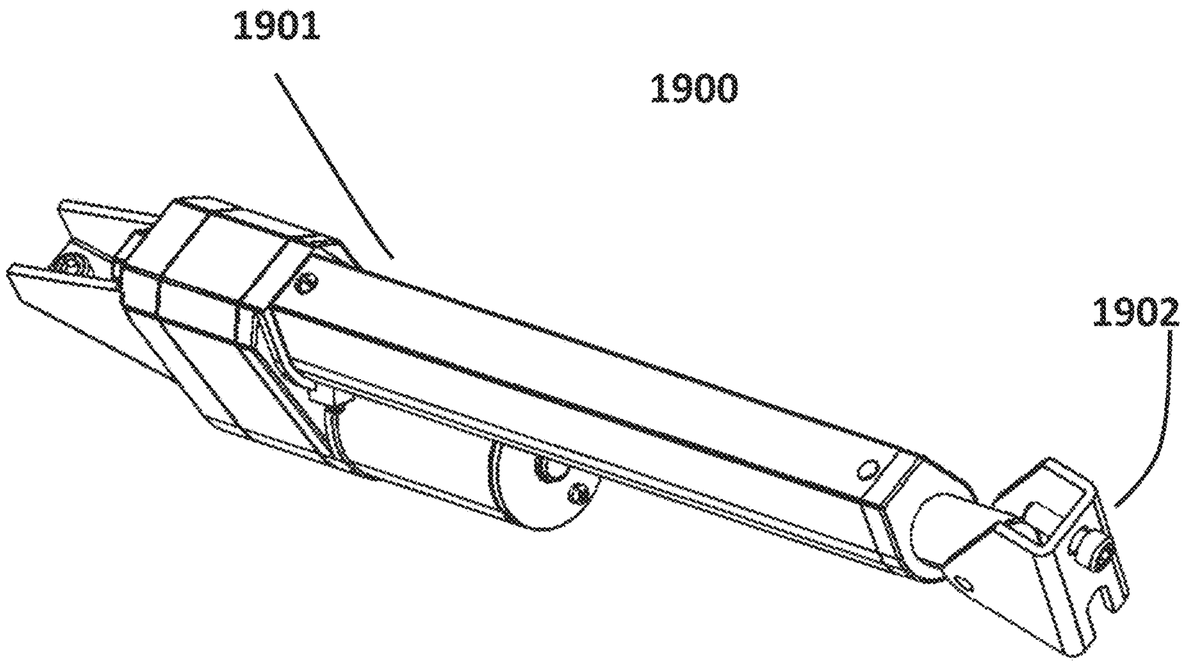
FIG. 5 shows the lock holder according to some embodiments of the invention.

FIG. 5 shows the controllable lock holder according to some embodiments of the invention.

The controllable lock holder 1900 is an extendible lock implementing controllable telescopic rod or a piston device, comprised of least two parts: a first part 1901 connected to the floor a second part 1902 moveable one in respect to the first part having third part 1903 connected by hinge 1904 to the second part. The third part is connected to rear panel 1805.

Figure 6:
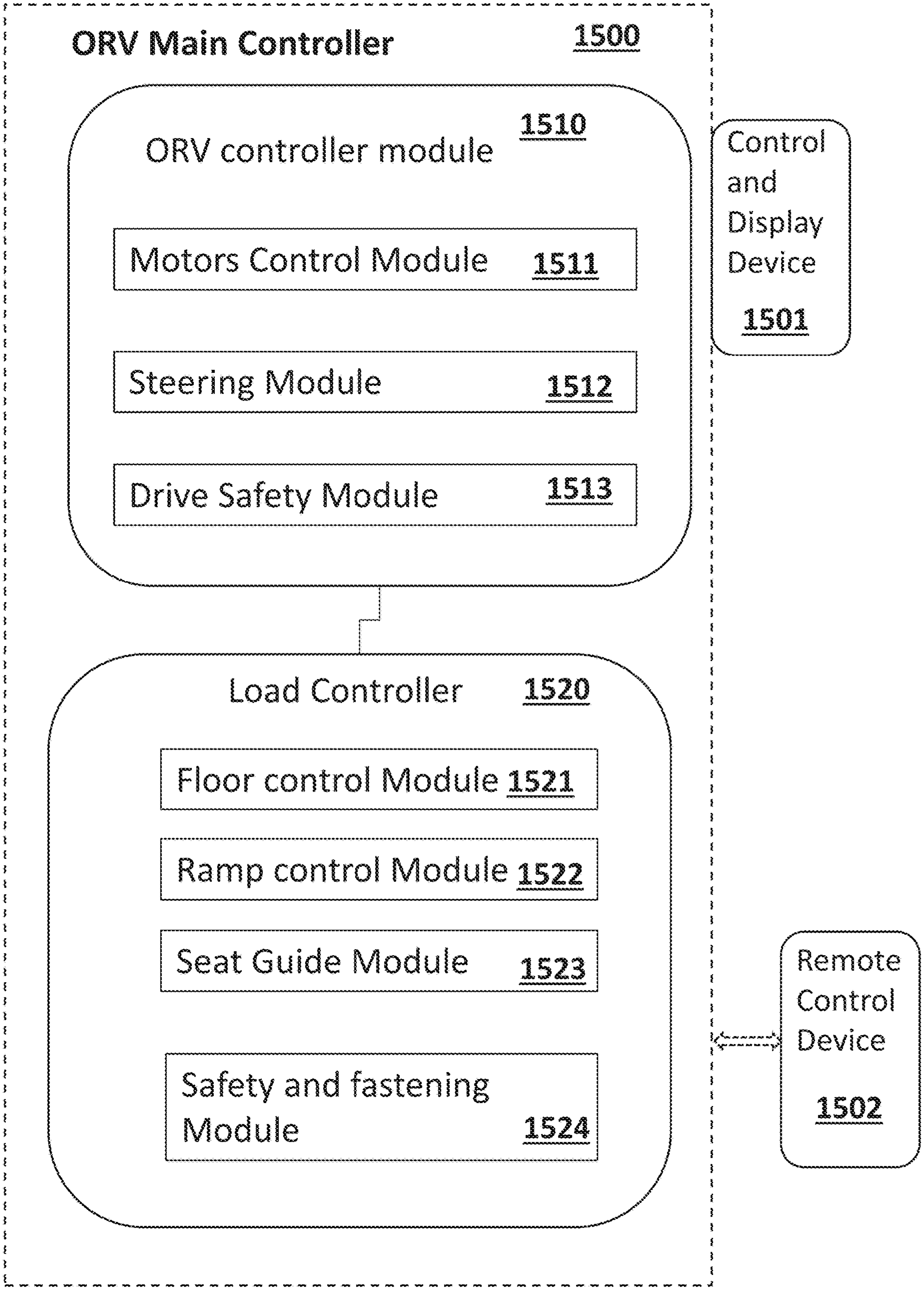
FIG. 6 shows a block diagram of a main controller module of the ORV, serving for both ORV driving control and for controlling the modular seat load system, according to some embodiments.

Reference is now made to FIG. 6, showing a block diagram schematically illustrating a main controller system 1500 of the ORV 1000, according to some embodiments. The main controller system 1500 may include at least two main units: an ORV controller module 1510 and a load controller 1520. All controllers 1510 and 1520 may include hardware, software and/or communication (transmission and/or receiving) means.

According to some embodiments, the ORV controller 1510 may include at least:

- a motor control module 1511 for controlling all electric motors 1401 operation e.g., by controlling rotation speed of each motor 1401 and therefore its respective ORV fheel, front and rear drive motors operation, motors operation coordination, etc.
- a steer control module 1512 for controlling steering of the ORV 1000; and
- (optionally) drive-safety module 1513 for operating additional safety-related drive features, for example by receiving and analyzing sensors data arriving from one or more sensors installed at the ORV 1000 for detection of road conditions, whether conditions, ORV drive mode and condition, ORV surrounding environmental conditions etc. and operating the motors 1401 and steering of the ORV 1000 based on sensor data analysis results.

According to some embodiments, the load controller 1520 may include at least:

a floor control module 1521 configured to control floor position (sloping mode) by controlling the controllable length-adjustment devices 1100;

a ramp control module 1522 configured to control rear panel 1805 by controlling the length and locking position of the lock holder 1900;

(optionally) a seat guide module 1523 configured to control the wheelchair guiding subsystem 1150; and (optionally) a safety and fastening module 1524 for controlling various safety control means and/or output alerts, e.g., based on safety related real time sensor data analysis and/or for controlling fastening of the driver seat to the ORV floor 1700 and/or frame 1200.

According to some embodiments, as shown in FIG. 6, the ORV 1000 may also use/include an embedded control and display device 1501 configured to display operational features of the ORV 1000 including current load/drive mode of the ORV 1000 and/or for displaying of ORV safety and/or operation/drive related information.

Additionally or alternatively, as shown in FIG. 6, a remote control device 1502, configured for wireless communication with the main controller 1500, used at least for remotely switching between the load/drive modes of the modular seat loading system and optionally also for remotely controlling other subsystems/mechanisms of the modular seat loading system and/or of the ORV 1000.

According to some embodiments, the main controller 1500 may further include a communication module (not shown) for communicating with one or more of:

electric motors 1401 of the ORV 1000;

gear and/or driving devices of the ORV 1000;

control and/or display devices of the ORV 1000 whether embedded in the ORV 1000 or remote device such as remote-control device 1502;

one or more sensors embedded in or installed at the ORV 1000;

fastening seat belt(s) for securing the driver in his/her loaded driver seat, one or more actuators and/or motors operating devices/apparatuses of the modular seat loading system.

The ORV 1000 may further include additional standard vehicle or ORV subsystems such as a gear system, forwards and reverse driving mode switching and driving systems, illumination devices and control systems, other additional suspension devices, etc.

Figure 7:
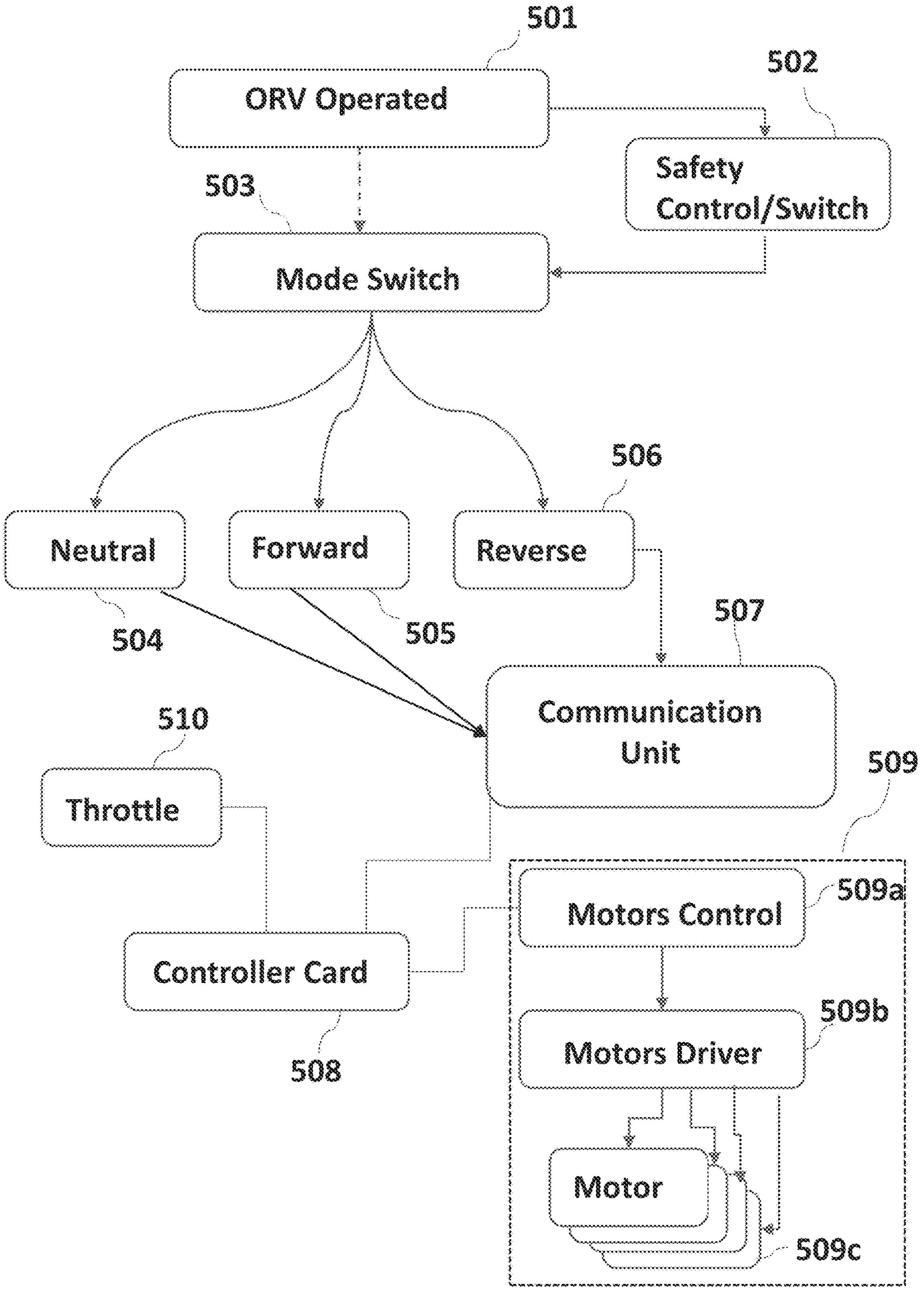
FIG. 7 shows a driving process and utilized system/ORV equipment, according to some embodiments.

Reference is now made to FIG. 7 illustrating main ORV driving process once the ORV is switched to a drive mode (and the desired driver seat is installed and secured to its required ORV driver seat location/area), according to some embodiments, the process may include for example:

operating (switching on or starting) the ORV 501;

using a safety control switch 502 for ensuring that the ORV can only be driven once no alarming situation is detected;

selecting a drive mode of the modular seat loading system 503;

selecting a driving-mode of the ORV (such as neutral 504, forward 505 or reverse 506):

Communicate with an ORV main controller (operable via a controller chip/card/hardware 508) using a communication unit 507; and Control each of the ORV motors 509 for driving and navigating the ORV.

The ORV or the modular seat load system embedded therein may also include at least one throttle subsystem 510 for controllable pumping and directing of air/gas to the piston devices of the controllable length-adjustment devices of the modular seat load system.

Although the above description discloses a limited number of exemplary embodiments of the invention, these embodiments should not apply any limitation to the scope of the invention, but rather be considered as examples of some of the manners in which the invention can be implemented.

The invention claimed is:

1. A modular seat loading system for removable loading of various driver seats onto an off-road vehicle (ORV), the modular seat loading system comprising at least:

(a) at least one controllable length-adjustment device comprising at least one extendible apparatus directly or indirectly connectable to a frame of the ORV, the at least one controllable length-adjustment device being configured and positioned for controllable adjustment of angular position of a floor of the ORV that is fixedly connected to the frame of the ORV, by controlling length of the at least one extendible apparatus, enabling controllably achieving at least two ORV modes switchable therebetween:

a load mode in which the ORV floor is tilted forming a tilted slope at a non-zero angle between the ORV floor and a ground surface plane, for loading and removing, upon requirement, a wheelchair or a wheel-less seat for serving as a driver seat of the ORV, for forming a modular wheelchair-accessible ORV; and a drive mode in which the ORV floor is lifted from the ground surface, (b) a load controller configured at least for adjusting length of the at least one controllable length-adjustment device, wherein the at least one controllable length-adjustment device is also used for controlling the movement suspension of the ORV by enabling natural expansion and contraction thereof in response to ORV movements and road conditions.

2. An off-road vehicle (ORV) comprising at least:

a steering mechanism for steering the ORV;

a rear wheels set including at least two rear wheels;

a front wheels set including at least two front wheels;

the frame;

the floor, which is fixedly attached to a lower side of the frame;

a motorization mechanism including at least a first rear motor and a first front motor;

a main controller for ORV drive control; and a modular seat loading system according to claim 1.

3. The modular seat loading system of claim 1 wherein the at least one length-adjustment device includes: one extendible apparatus and one or more connectors for fixedly connecting the extendible apparatus to the frame or to the floor of the ORV.

4. The modular seat loading system of claim 1 wherein the at least one length adjustment device is connected to a rear axle of the rear wheels of the vehicle or to at least one rear wheel hinge such that when the extendible apparatus is extended in length, a respective one of the wheels to which it connects is lifted from the ground and when the extendible apparatus is contracted in length the respective rear wheel is lowered.

5. The modular seat loading system of claim 1 wherein the at least one length adjustment device functions as the ORV's rear suspensions, as lifting of the rear wheels of the vehicle cause natural responsive contraction of the extendible apparatus of each length-adjustment device and vice versa.

6. The modular seat loading system of claim 1 wherein the at least one extendible apparatus of the length-adjustment device includes a pneumatic or hydro-pneumatic position device having a piston part and a housing part, where the piston part is movably insertable in the housing part.

7. The modular seat loading system of claim 1 wherein the at least one length-adjustment device is located externally to walls of the ORV adjacent to side walls of the ORV for allowing the extendible apparatus a large-enough span of extension thereby also enabling improved suspension/damping of ORV movements for challenging terrain conditions.

8. The modular seat loading system of claim 1 wherein the modular seat loading system comprises at least one controllable lock holder that rigidly connects at one end thereof to the ORV floor and at another end thereof to a rear wall or panel of an ORV cover, wherein the rear wall of the ORV is releasably connectable to the ORV frame, such that when the controllable lock holder is unlocked, at least one side of the rear panel is released from its releasable connection to the ORV frame, for titling along with the ORV floor, forming a loading ramp-extension, when the ORV is switched to the load mode, wherein the lock holder is configured such that the rear panel can be lifted back thereby, to an upright position, when the ORV is switched to the drive mode.

9. The modular seat loading system of claim 1 further comprising a controllable lock holder that is controllable by the load controller such that when the modular seat loading system is switched to a load mode the ORV floor and an ORV rear wall are both automatically lowered forming an extended sloped floor reaching the ground surface, for enabling an easy and safe driving of a wheelchair thereover and there-along, for having a disabled driver safely and comfortably reaching a driver seat location/area inside the ORV.

10. The modular seat loading system of claim 1 further comprising, a seat-fastening mechanism, for locking, fastening or attaching a loaded driver seat to the ORV's frame and/or floor at a driver seat area of the ORV and at a desired seat position, wherein further comprising one or more tracks for easy rolling of a wheelchair's wheels therein or thereover and for directing the wheelchair along the ORV's floor, preventing thereby the wheelchair from turning and/or slipping over the ORV floor.

11. The modular seat loading system of claim 1 further comprising a lock holder configured such that a vehicle rear panel is lifted back thereby.

12. The modular seat loading system of claim 1 further comprising an extendible lock having at least two parts: a first part and a second part moveable one in respect to the other for extending and contracting in an overall length thereof, such that when a lock holder is at a maximal extension span a rear panel of the ORV is at a coplanar position with the ORV floor to enable a load position mode ramp-extension, and when the lock holder is at a minimal extension span the rear panel is at an upright position with the ORV floor to enable the drive mode.

13. The modular seat loading system of claim 1, wherein the at least one controllable length-adjustment device further comprising:

a first lower connector fixedly connected to a side part of the frame or of a cover panel of the of the ORV; and a second connector fixedly connected to a lower floor part of the frame or a lower side cover panel part of the of the ORV;

wherein the extendible apparatus, first connector and the second connector form a triangular shape forming a non-zero angle θ between an x1 axis aligned with the second connector and an extension axis EX that may change and be different at the load mode of the ORV and at its drive mode.

14. The modular seat loading system of claim 1 wherein the load controller comprises at least:

a floor control module configured to control floor position by controlling the controllable length-adjustment devices;

a ramp control module configured to control a rear panel of the vehicle by controlling the length and locking position of a lock holder;

a seat guide module configured to control a wheelchair guiding subsystem.

15. The modular seat loading system of claim 1 further comprising a wheelchair guiding subsystem comprising tracks and an adjustment mechanism, configured and positioned for enabling adjustment of one or more features of the wheelchair guiding subsystem.

16. The modular seat loading system of claim 1, further comprising an ORV controller comprised of a motor control module for controlling all electric motors and a steer control module for controlling steering of the ORV.

17. The modular seat loading system of claim 1 wherein a main controller module includes at least two main units: an ORV controller module and the load controller.

* * * * *